US007113075B2

(12) United States Patent
Odorcic et al.

(10) Patent No.: US 7,113,075 B2
(45) Date of Patent: Sep. 26, 2006

(54) POWER SUPPLY METHODS AND APPARATUS

(75) Inventors: Kresimir Odorcic, Shepherdsville, KY (US); Scott Horning, Overland Park, KS (US); Timothy Ray Jackson, Louisville, KY (US); Timothy Francis Powell, Mentor, OH (US); Cecilia Maria Blanchard, Shepherdsville, KY (US); Meher Prasadu Kollipara, Louisville, KY (US); Mark Dilip Shah, Louisville, KY (US); Gregory Michael Thomas, Louisville, KY (US)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 10/745,271

(22) Filed: Dec. 23, 2003

(65) Prior Publication Data

US 2005/0134469 A1 Jun. 23, 2005

(51) Int. Cl.
*H04M 11/04* (2006.01)

(52) U.S. Cl. ............................... 340/310.1; 340/310.2; 340/661.1; 361/42; 361/45; 361/93.2

(58) Field of Classification Search ................. 361/42, 361/93.2, 45, 93.1; 340/661.1, 310.1, 310.2
See application file for complete search history.

(56) References Cited

U.S. PATENT DOCUMENTS 3,962,606 A * 6/1976 Burns et al. .................. 361/45
4,345,145 A 8/1982 Norwood
4,817,582 A 4/1989 Oslin et al.
4,851,644 A 7/1989 Oslin
5,015,827 A 5/1991 Kadwell et al.
5,224,006 A * 6/1993 MacKenzie et al. .......... 361/45
5,324,918 A 6/1994 Kadwell et al.
5,378,874 A 1/1995 Holling et al.
5,432,667 A * 7/1995 Rau et al. ................... 361/124
5,485,093 A * 1/1996 Russell et al. .............. 324/522
5,534,678 A 7/1996 Bowles et al.
6,112,135 A 8/2000 Peterson et al.
6,169,383 B1 * 1/2001 Johnson ...................... 318/771
6,525,914 B1 * 2/2003 Legatti ........................ 361/42
6,909,586 B1 * 6/2005 Culler et al. ............... 361/93.2

* cited by examiner

*Primary Examiner*—Tai Nguyen
(74) *Attorney, Agent, or Firm*—Armstrong Teasdale, LLP

(57) ABSTRACT

A detection circuit includes a first power line, a first signal conditioning module operationally coupled to the first power line, a neutral line (N) operationally coupled to the first signal conditioning module, a second signal conditioning module operationally coupled to the first power line, a second power line operationally coupled to the second signal conditioning module, and an analog to digital (A/D) converter operationally coupled to the first and the second signal conditioning modules.

8 Claims, 9 Drawing Sheets

POWER SUPPLY METHODS AND APPARATUS

BACKGROUND OF THE INVENTION

This invention relates generally to power management systems and methods, and more particularly, to power supply systems and methods for cooking platforms.

There exist different types of cooking platforms which incorporate various appliances that can be activated individually or simultaneously. For example, a typical electric household range includes an oven and generally four surface heating elements. Once the cooking platform is connected within a household, there will be a preset power supply limit available for use by the cooking platform. In some instances, the cooking platform is connected to a nominal 240 volt alternating current (ac) circuit using a neutral wire to create two separate 120 volt circuits internal to the cooking apparatus. The three wires used in 240 volt wiring are commonly referred to L1, L2, and N, where N represents neutral, and wherein L1 and L2 are both 120 volts different from neutral and 240 volts from each other. As used herein, a mis-wire condition refers to conditions wherein the L1–L2 voltage is not within a specified range due to a mis-wiring of the appliance (e.g., L1 is wired to a neutral lug of the appliance). Also as used herein a neutral fault condition exists when N is not connected to the neutral lug. It would be desirable to determine when mis-wire conditions and/or neutral fault conditions occur.

BRIEF SUMMARY OF THE INVENTION

In one aspect, a detection circuit is provided. The circuit includes a first power line, a first signal conditioning module operationally coupled to the first power line, a neutral line (N) operationally coupled to the first signal conditioning module, a second signal conditioning module operationally coupled to the first power line, a second power line operationally coupled to the second signal conditioning module, and an analog to digital (A/D) converter operationally coupled to the first and the second signal conditioning modules.

In another aspect, a method for detecting at least one of a mis-wire and a neutral fault in an oven is provided. The method includes comparing an alternating current (AC) voltage between a first power line and a neutral line to a first reference voltage range, and comparing an AC voltage between the first power line and a second power line to a second voltage range.

In yet another aspect, an oven includes at least one electrical device wired via a relay between a first power line and a neutral line, at least one electrical device wired via a relay between the neutral line and a second power line, a first signal conditioning module operationally coupled to the first power line and the neutral line, a second signal conditioning module operationally coupled to the first power line and the second power line, and an analog to digital (A/D) converter operationally coupled to the first and the second signal conditioning modules.

DETAILED DESCRIPTION OF THE INVENTION

The present invention is directed, in one aspect, to operation of an oven that includes at least two electrical devices on different 120 volt (V) circuits which together form a 240 V circuit. Although one specific embodiment of a radiant/microwave cooking oven is described below, it should be understood that the present invention can be utilized in combination with many other such ovens and is not limited to practice with the oven described herein. For example, the oven described below is an over the range type oven. The present invention, however, is not limited to practice with just over the range type ovens and can be used with many other types of ovens.

Figure 1:
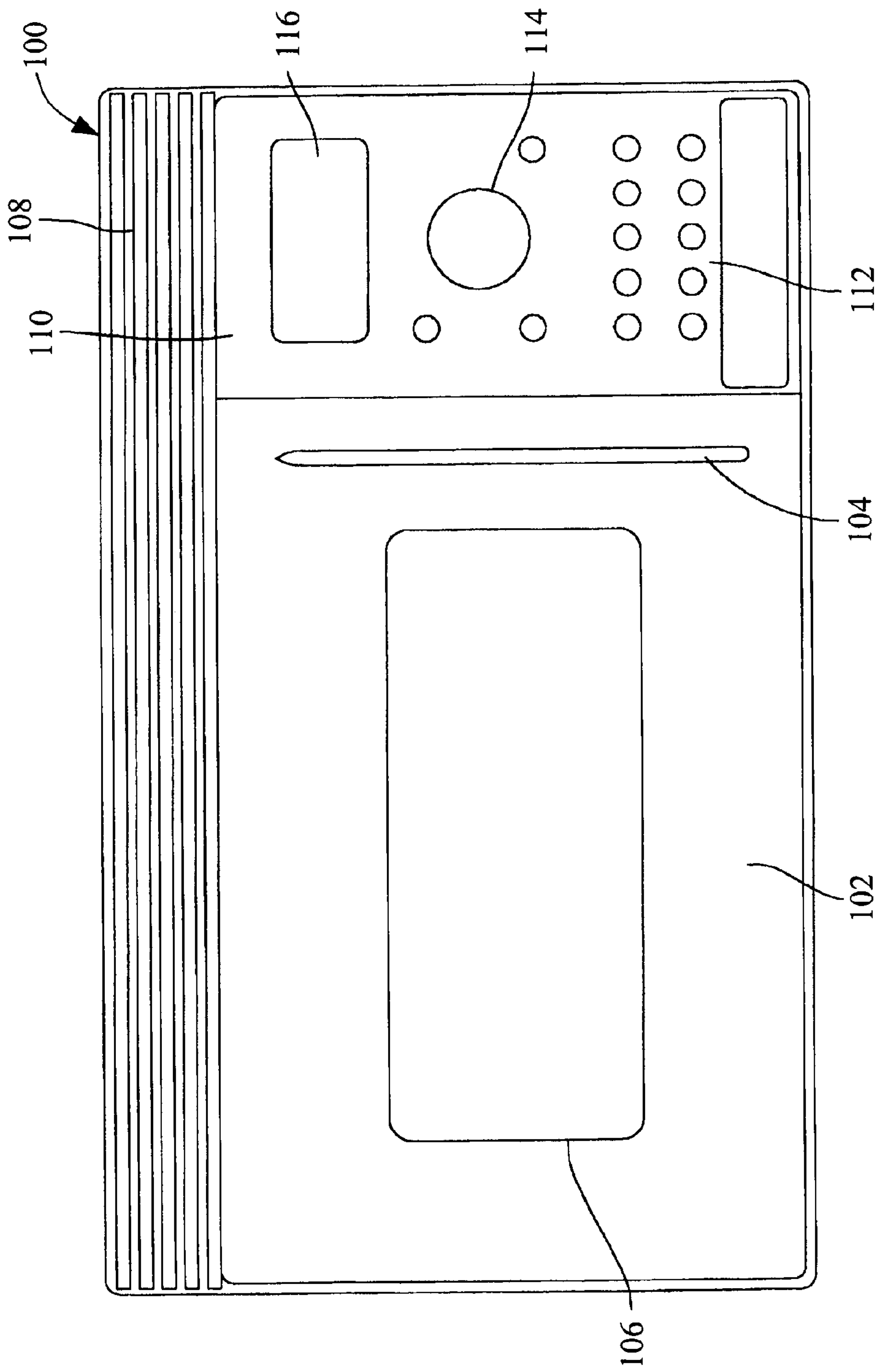
FIG. 1 is a front view of an oven.

FIG. 1 is a front view of an over the range type oven 100. Oven 100 includes a frameless glass door 102 having an injection molded handle 104. A window 106 is provided for visualizing food in the oven cooking cavity. Door 102 has an inner metal frame that extends around the door periphery and comprises an RF door choke. The glass of door 102 has, for example, a thickness of about ⅛" and can withstand high temperatures, as is known in the art, and is secured to the inner metal frame by an adhesive. Handle 104 also is secured to the metal frame by bolts that extend through openings in the glass. Oven 100 also includes an injection molded plastic vent grille 108 and a frameless glass control panel 110.

A rubber tactile switch covers 112 are located over each key pad of panel 110, and an injection molded knob or dial 114 is provided for making multiple selections. Selections are made using dial 114 by rotating dial 114 clockwise or counter-clockwise and when the desired selection is displayed, pressing dial 114. Instructions and selections are displayed on a liquid crystal display 116.

The following functions can be selected from respective key pads of panel 110.

| | |
|---|---|
| CLEAR/OFF | Selecting this pad stops all cooking and erases the current program. |
| DELAYED START | Selecting this pad results in a delay in the start of cooking. |
| HELP | Selecting this pad enables an operator to find out more about the oven and its features. |
| MICROWAVE | Selecting this pad enables defrosting, heating beverages, reheating leftovers, popcorn, vegetables, and all types of microwave cooking. |
| MICROWAVE EXPRESS | Selecting this pad enables quick and easy warming of a sandwich, or reheat of coffee. |
| OPTIONS ON/OFF | Selecting this pad enables access to the auto night light, beeper volume control, clock, clock display, and display scroll speed features. |
| OVEN LIGHT | Selecting this pad during microwave cooking illuminates the cavity. |

-continued

| | |
|---|---|
| POWER LEVEL | Selecting this pad enables adjusting the power levels for speed cooking and microwave cooking. |
| REMINDER | Selecting this pad enables an operator to select a time at which an alarm is to sound. |
| REPEAT LAST | Selecting this pad facilitates cooking repetitive items such as cookies and appetizers. |
| SPEED COOK MANUAL | Selecting this pad enables an operator to manually enter speed cooking time and power levels. |
| START/PAUSE | Selecting this pad enables an operator to start or pause cooking. |
| SURFACE LIGHT | Selecting this pad turns ON/OFF the surface light for the cooktop. |
| TIMER ON/OFF | Selecting this pad controls a general purpose timer (e.g., minutes and seconds) |
| VENT FAN | Selecting this pad enables an operator to clear the cooktop area of smoke or steam. |

Figure 2:
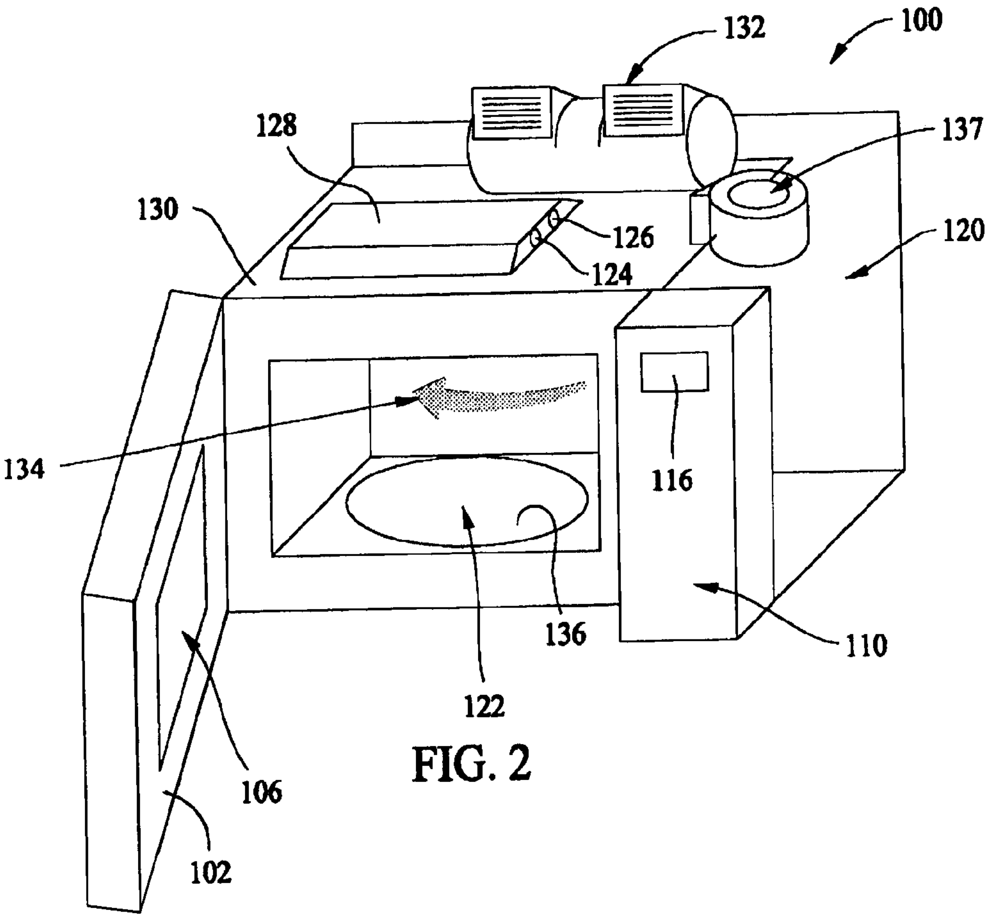
FIG. 2 is a perspective schematic view of a portion of the oven shown in FIG. 1.

FIG. 2 is a perspective schematic view of a portion of oven 100. Oven 100 includes a shell 120, and a cooking cavity 122 is located within shell 120. Cooking cavity 122 is constructed using high reflectivity (e.g., 72% reflectivity) stainless steel. Halogen lamps 124 and 126, and a reflective plate 128 are mounted to an upper panel 130 of shell 120. As described below in more detail, a halogen lamp also is located at a lower section of shell 120. An exhaust system 132 also is mounted to shell 120. Air flows through cavity 122 in a direction indicated by arrow 134. A cooling system 137 is mounted to shell 120 for cooling oven components.

Figure 3:
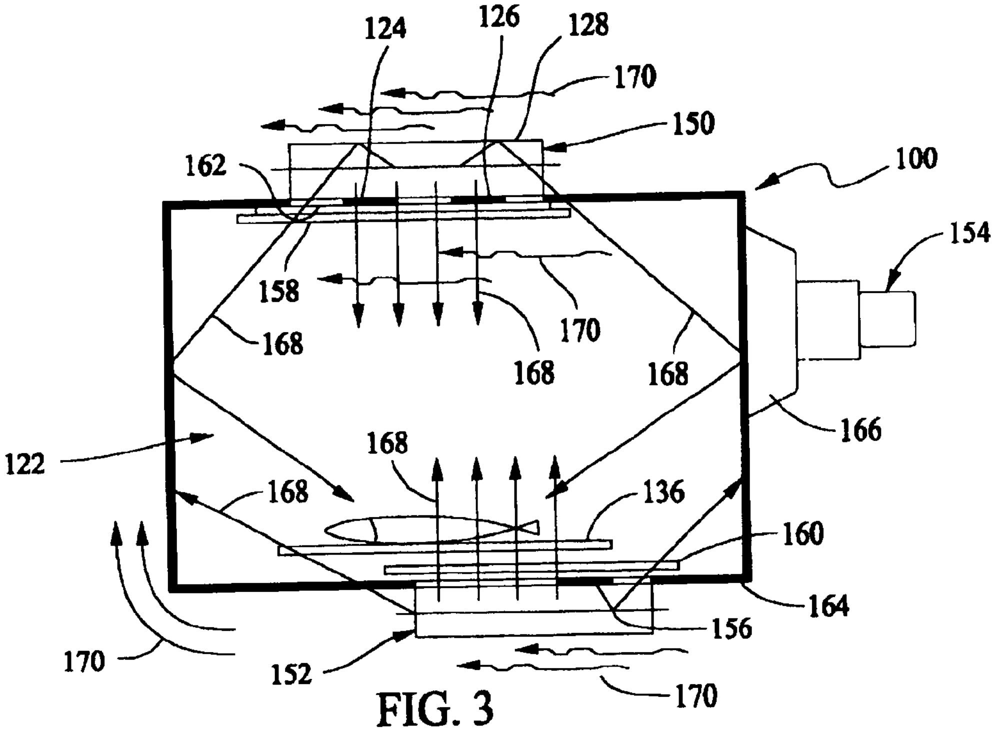
FIG. 3 is a schematic illustration of the radiant cooking unit and the microwave cooking unit relative to the cooking cavity.

FIG. 3 is a schematic illustration of oven 100, and particularly of halogen lamp cooking units 150 and 152 and microwave cooking unit 154 relative to cooking cavity 122. As shown in FIG. 3, upper cooking unit 150 includes two halogen lamps 124 and 126 and cooking unit 152 includes one halogen lamp 156. Lamps 124, 126, and 156, in an exemplary embodiment, are 1500 W halogen lamps having a color temperature of 2300K, each with an output power of 1.5 kW (4.5 kW total for all three lamps). Lamp 124 is referred to as the upper center lamp, and lamp 126 is referred to as the upper exterior lamp. Lamp 156 is referred to as the lower lamp. Glass plates 158 and 160 extend over cooking units 150 and 152 between lamps 124, 126, and 156 and cavity 122. Also, twist mesh screens 162 and 164 having an opening ratio of 80% are provided for additional protection. Additional details are provided below with respect to reflector 128. A magnetron 166 of microwave cooking unit 154 is located on a side of cavity 122. Magnetron 166, in an exemplary embodiment, delivers a nominal 950 W into cavity 122 according to standard IEC (International Electrotechnical Commission) procedure.

Figure 4A:
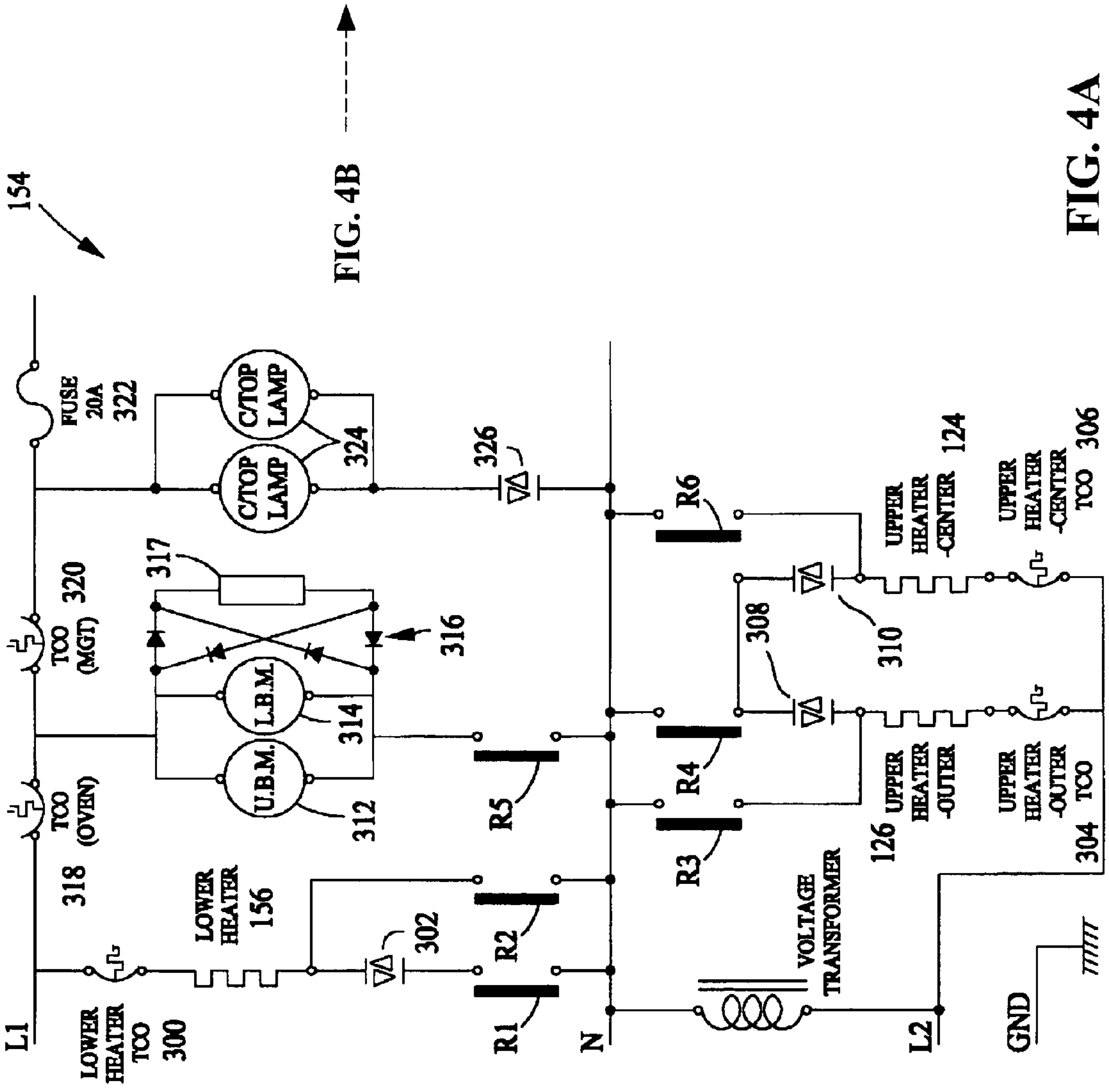
FIG. 4 (FIGS. 4A and 4B collectively) is a schematic diagram of a circuit.
Figures 4A, 4B:
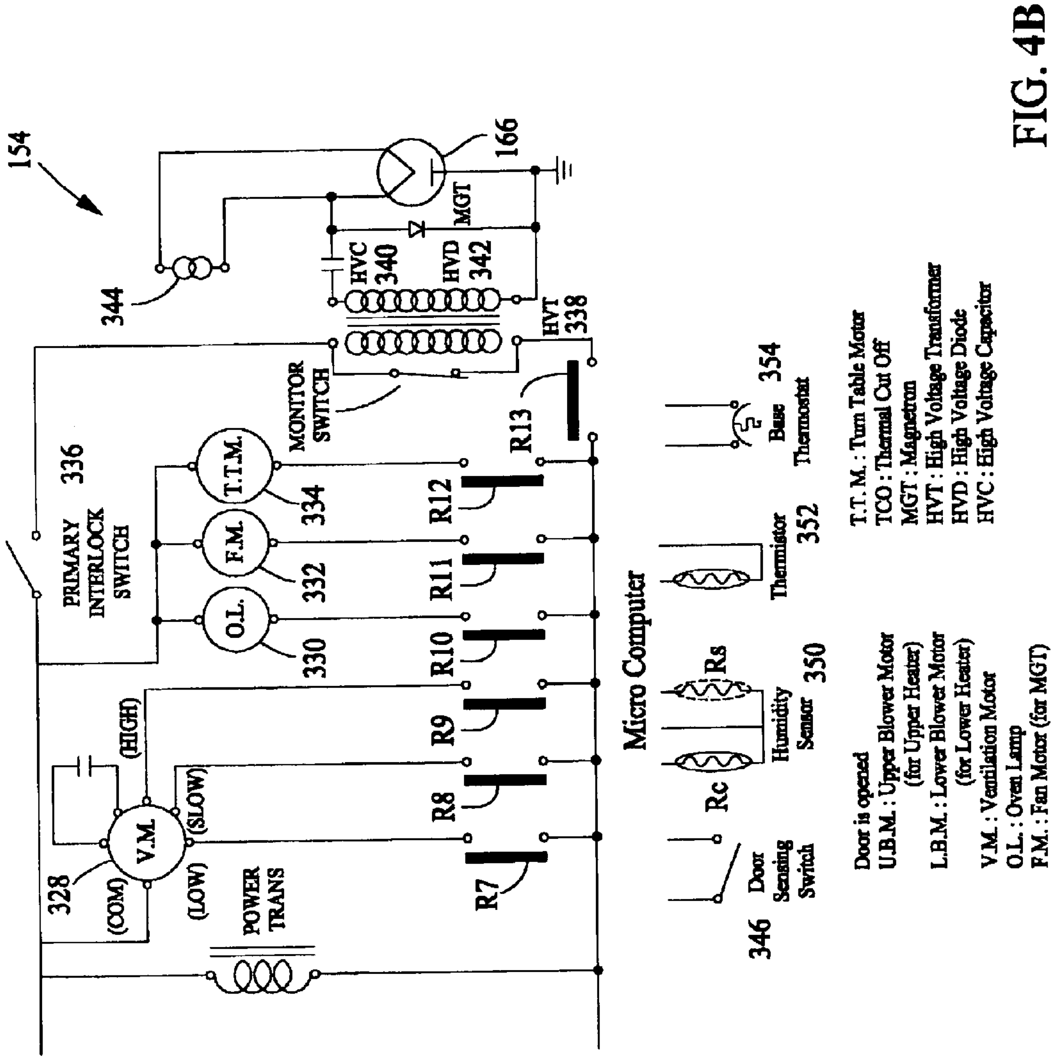

FIG. 4 is a schematic diagram of a circuit which can be used to supply power to oven 100. More specifically, power is provided to oven 100 via lines L1, L2, and N. Relays R1–R13 are connected to a microcomputer (e.g., controller 418 shown in FIG. 5) which is programmed to control the opening and closing thereof. Lower lamp 156 is electrically connected to line L1 via a thermal cut off 300. Energization of lower lamp 156 is controlled by relays R1 and R2. A triac is in series with relay R1 to provide a soft start, as described below in more detail. Upper lamps 126 and 124 are connected to line L2 via thermal cut offs 304 and 306. Triacs 308 and 310 are in series with relay R4.

Relays R1 and R4 are air gap type relays, and are in series with triacs 302 and 308, respectively. Relays R1 and R4 are closed in the soft start operation of respective lamps 124, 126, and 156 to enable energization of triacs 302 and 308. After completion of the soft start, relays R1 and R4 are open. Relays R2, R3, and R6 are controlled by the microcomputer to close after the soft start is completed to hold lamps 124, 126, and 156 on based on the particular power setting.

Oven 100 also includes an upper blower motor 312 and a lower blower motor 314 for cooling. A rectifier circuit 316 is provided for rectifying an AC input signal to a DC output signal to be supplied to a synchronous motor 317. Synchronous motor 317, when energized, closes a damper (not shown). Thermal cut outs 318 and 320 and a fuse 322 also are provided to protect oven components, e.g., from overheating or an overcurrent condition. Cooktop lamps 324 are electrically connected in series with a triac 326 and are provided for illuminating the cooktop.

Figure 9:
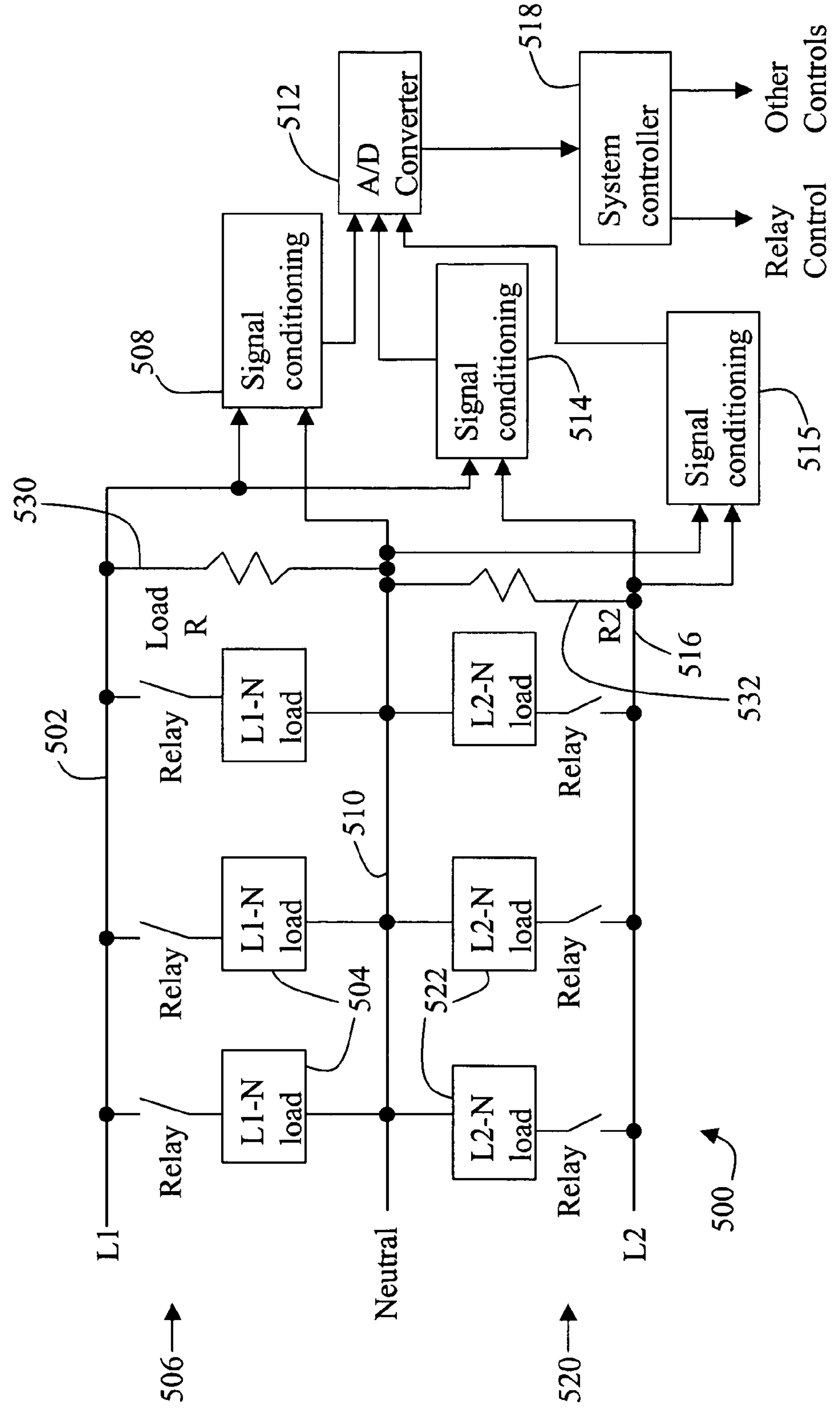
FIG. 9 is an alternative embodiment of the circuit shown in FIG. 5.

A vent motor 328 having low, slow, and high speeds selectable via relays R7, R8, and R9 is provided for removing fumes from over the cooktop. An oven lamp 330, fan motor 332, and a turn table motor 334 are controlled by separate relays R10, R11, and R12. A primary interlock switch 336 is located in door 102 and prevents energization of cooking elements unless door 102 is closed. A relay R13 controls energization of microwave cooking unit 154. Microwave cooking unit 154 includes a high voltage transformer 338 which steps up the supply voltage from 120V to 2000V. A high voltage capacitor 340 and a high voltage diode 342 circuit steps up the voltage from transformer 338 from 2000V to 4000V. This high voltage is supplied to magnetron 166 and the output of magnetron 166 is supplied to a waveguide 344 which directs RF energy into cooking cavity 122. As also shown in FIG. 9, oven 100 includes a door sensing switch 346 for sensing whether door 102 is opened, a humidity sensor 348 for sensing the humidity in cooking cavity 122, a thermistor 350, and a base thermostat 352.

With respect to speed cooking operation of oven 100, the microcomputer controls relays R1–R6 and R13 based on the power level either associated with the preprogrammed cooking program or manually entered. In the speed cooking mode, for example, if a power level 9 is selected, the upper exterior lamp 124 has a target on-time of 29 seconds of a 32 second duty cycle, upper center lamp 126 has a target on-time of 25 seconds of a 32 second duty cycle, lower lamp 156 has a target on-time of 29 seconds of a 32 second duty cycle, and magnetron 16 has a target on-time of 29 seconds of a 32 second duty cycle. A duty cycle of 32 seconds is selected for one particular implementation. However, other duty cycles could be utilized. As used herein the term "electrical device" refers to all known oven components which use electricity, such as, for example, lamps, motors, displays, heaters, bake elements, broil elements, magnetrons, etc.

To increase lamp reliability, a soft start operation is used when energizing lamps 124, 126, and 156. Particularly, in accordance with the soft start operation, triacs 302, 308, and 310 are utilized to delay lamp turn-on. For example, upper exterior lamp 126 and lower lamp 156 are delayed for one second from commanded turn-on to actual turn-on. Upper center lamp 124 is delayed for two seconds from commanded turn-on to actual turn-on. Therefore, the target turn-on times are different from the commanded on-times.

Figure 5:
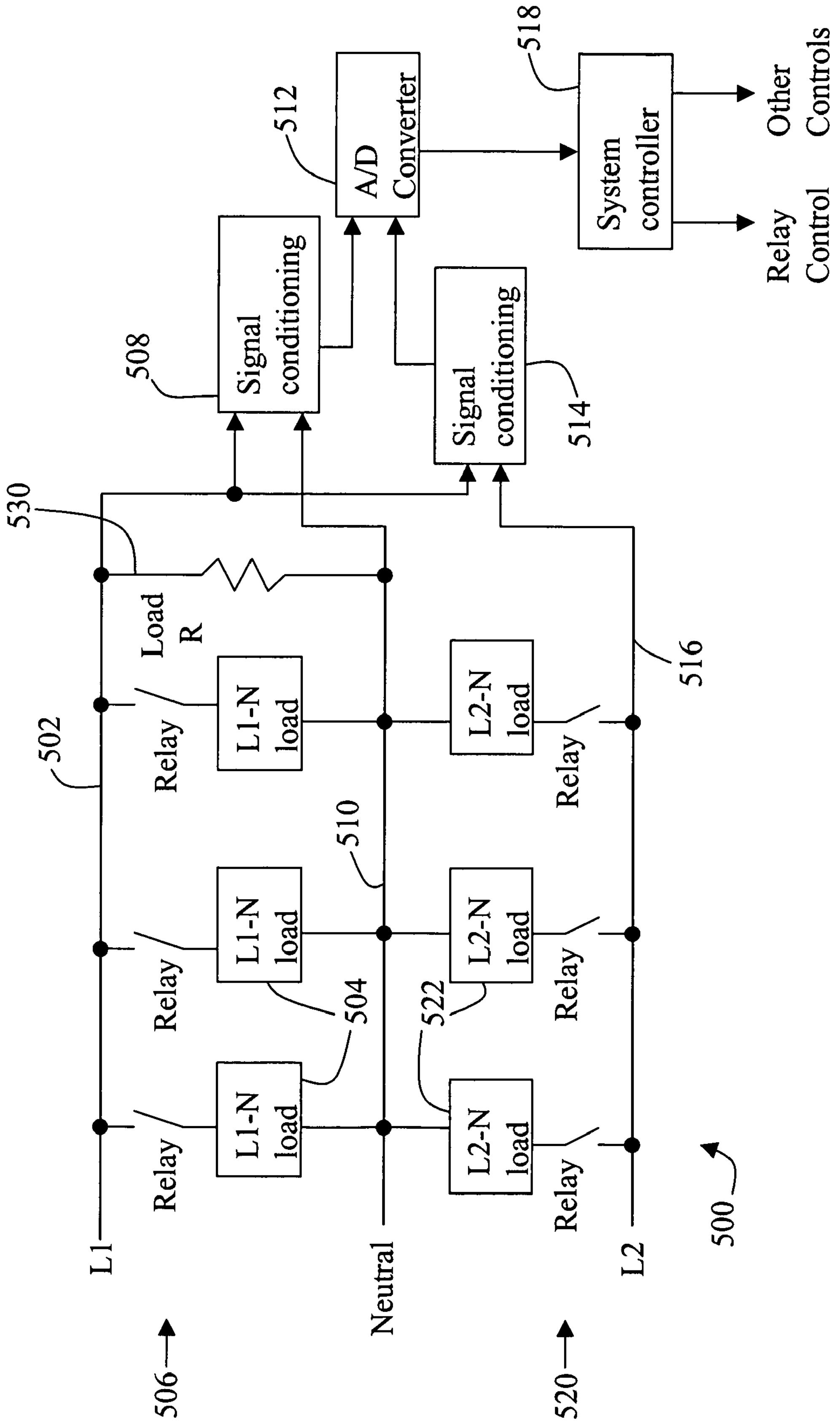
FIG. 5 is a schematic diagram of a mis-wire and neutral fault detection circuit.

FIG. 5 illustrates a mis-wire and neutral fault detection circuit 500 which can be incorporated in the circuit illustrated in FIG. 4. Circuit 500 measures line voltages to detect if a mis-wired and/or a neutral fault condition exists. When a mis-wired and/or a neutral fault condition is detected, then normal operation of oven 100 is inhibited, and a user or an oven installer is notified.

Circuit 500 includes an L1 line 502 connected to a plurality of loads 504 via a plurality of relays 506. Although circuit 500 is illustrated with three loads 504 and relays 506, circuit 500 may include more than three loads, such as, for example, the loads illustrated in FIG. 4. L1 line 502 is connected to a signal conditioning module 508 which is also connected to a neutral line 510. Signal conditioning module 508 outputs a direct current (DC) voltage proportional to the voltage between L1 line 502 and neutral line 510 to an Analog to Digital (A/D) converter 512. A second signal conditioning module 514 provides A/D converter 512 with a DC voltage proportional to the voltage between L1 line 502 and an L2 line 516.

Digital representations of the voltages (L1–N and L1–L2) are sent from A/D converter 512 to a system controller 518. System controller 518 controls relays 506, a plurality of relays 520 positioned between L2 516 and neutral 510, and other controlled devices. Relays 520 allow for selective power supply to a plurality of L2–N loads 522. The term "loads" as used herein refers to both the power consumption of any connected electrical devices as well as the electrical devices themselves. In an alternative embodiment, L2–N voltage is used instead of the L1–N voltage.

In use, circuit 500 system measures the line voltage from L1 line to L2 line (L1–L2, nominal 240 VAC) and the line voltage from L1 to Neutral (L1–N, nominal 120 VAC) or L2 to Neutral (L2–N, 120 VAC) to determine if oven 100 has been mis-wired or if a Neutral fault condition exists. A mis-wire condition exists when the L1–L2 voltage is not within a specified range. This can occur due to incorrect connections within oven 100 or with the source power wiring (L1 and Neutral swapped for example). A Neutral fault condition exists when the neutral line is not connected, due to incorrect connections within the system or power source wiring. This condition can be due to a wire becoming disconnected during operation, or can occur at a power transformer feeding power to a residence or other building due to environmental conditions or other reasons. When a neutral fault condition exists, and at least one L1–N 504 load is on at the same time as at least one L2–N load 522 is on, the L1–L2 voltage (240 VAC) is then connected across a series combination of the L1–N and L2–N loads. The resulting voltages across L1–N and L2–N are then dependent on the impedance of the respective loads. In some cases, this could result in excessive voltage across some of the loads resulting in thermally over stressed load components. Therefore system controller 518 includes software that calculates the line voltages from the digital representations provided from A/D converter 512 and then controller 518 determines that the two line voltages are within a specified tolerance. Typical tolerances include ranges of 10–15% around the nominal value. If the line voltages are not within the specified tolerances, controller 518 provides an alert, typically a visual indication via display 116. Therefore, during an installation or repair resulting in a mis-wire or neutral condition, an installer or repairperson is informed and can quickly fix the condition. Although, described in the context of an oven, it is contemplated that the benefits of the invention accrue to all appliances, such as, for example, but not limited to, a cloths dryer or any other appliance using 240 VAC.

In one embodiment, circuit 500 includes a load resistor 530 positioned between L1 line 502 and neutral line 510. In embodiments where L2–N voltage is used rather than L1–N, resistor 530 is positioned between L2 line 516 and neutral line 510.

Because leakage currents could cause the L1–N voltage to be close to 120 VAC when a neutral fault exists, or loads that are on when a neutral fault needs to be detected that cause even voltages from L1–N and L2–N when a neutral fault condition exists, load resistor 530 is sized to draw more current than the leakage path current when neutral line 510 is disconnected. This facilitates a low L1–N voltage when neutral line 510 is disconnected. Without resistor 530, when neutral line 510 is not connected and there are no 120 VAC loads turned on, leakage paths could result in a L1–N voltage that is near 120 VAC, inhibiting the neutral fault detection. If the L1 to L2 voltage is not within the 240 VAC specification, a mis-wire is detected and system controller 518 turns off all loads, inhibits normal operation and indicates the condition to the user or installer. In one embodiment, the indication is a visual indication via display 116 and/or an audio indication via an audio output device such as a buzzer or speaker. The installer can quickly correct the mis-wire saving a service call from an owner or buyer.

To detect neutral faults after an installation, and in one embodiment, L1 to N voltage is checked periodically, such as, for example, every 3 to 5 seconds. In other embodiments, L1 to N voltage is checked every 1 to 7 seconds. If the L1 to N voltage is not within the 120 VAC specification, a neutral fault is detected, and system controller turns off all 120 V loads, inhibits normal operation, and indicates the condition on display 116. The user can call an electrician, or the local power company to correct the power wiring of the residence or the power source, saving a service trip.

Also if the L1 to L2 voltage is not within the 240 VAC specification, a mis-wire is detected and system controller 518 turns off all loads, inhibits normal operation and indicates the condition to the user or installer.

Accordingly, damage to components during production, installation, and during usage are reduced. System controller 518 indicates to production assemblers/testers and installers if there is a mis-wire and or a neutral fault before damage to components occur. In one embodiment, controller 518 includes a memory (not shown) for reading instructions and/or data. In another embodiment, controller 518 executes instructions stored in firmware (not shown). Controller 518 is programmed to perform functions described herein, but other programmable circuits can be likewise programmed. Accordingly, as used herein, the term controller is not limited to just those integrated circuits referred to in the art as controllers, but broadly refers to controllers, computers, processors, microcontrollers, microcomputers, programmable logic controllers, application specific integrated circuits, and other programmable circuits. Also, although illustrated in the context of an appliance, it is contemplated that the benefits of the invention accrue to any device utilizing 240 VAC electricity where some components in the device utilize 120 VAC power. Also although described in the context of monitoring both L1–N voltage and L1–L2 voltage, some embodiments monitor only one of the two voltages. Additionally, as described above, L2–N voltage can be used instead of L1–N voltage. Moreover, as illustrated in FIG. 9, L1–N and L2–N both be monitored.

Figure 6:
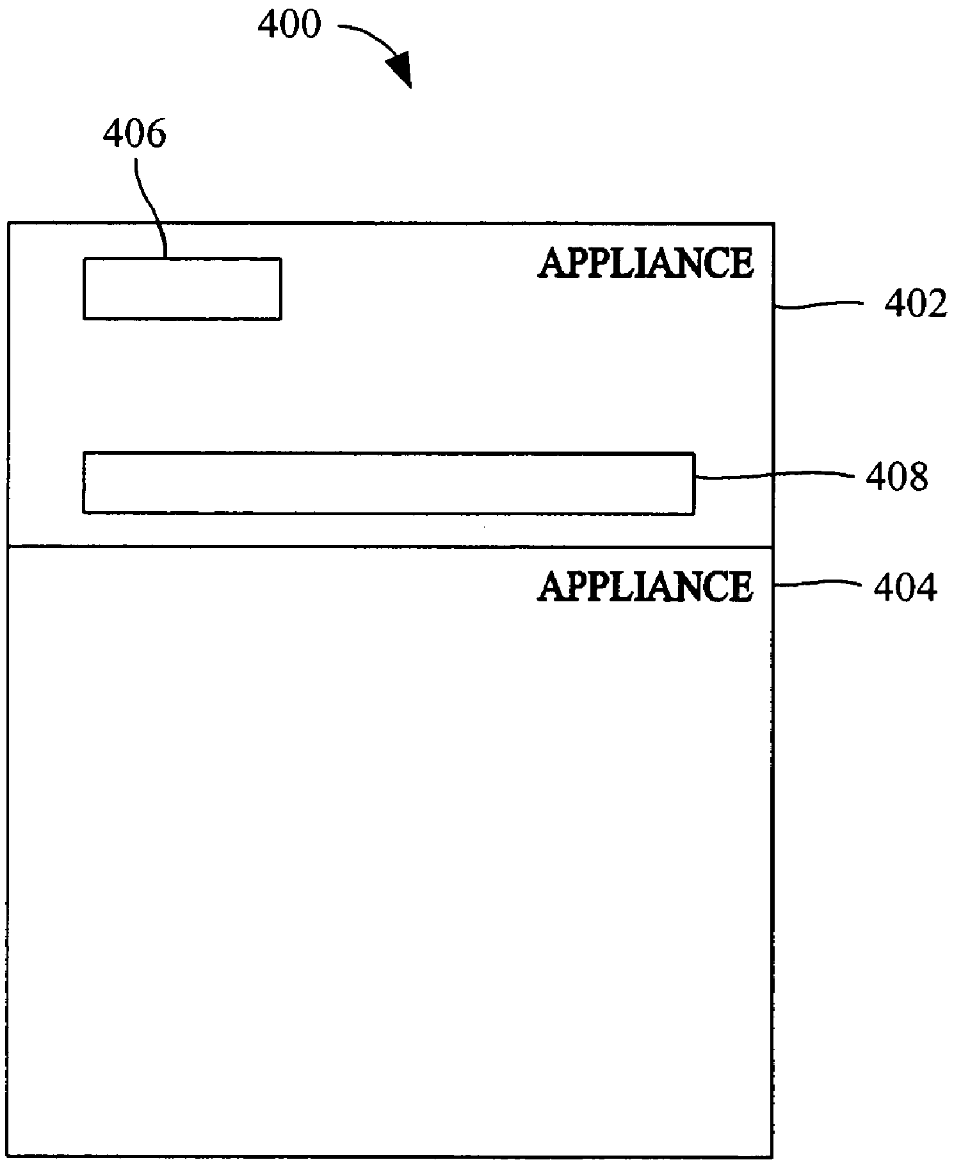
FIG. 6 is a block diagram of an embodiment of a cooking platform.

FIG. 6 is a block diagram of an embodiment of a cooking platform 400 in which circuit 500 described herein can be implemented. Cooking platform 400 has an appliance 402 and an appliance 404 located below appliance 402. Examples of appliance 402 include a speedcooking oven, a convection oven, and at least one surface heating element. An illustration of the speedcooking oven includes an Advantium™ that is manufactured by General Electric Appliances, Louisville, Ky. Another illustration of the speedcooking oven is described below. Appliance 402 includes an element 406, which can be, for instance, a magnetron, a surface heating element, or a broil heating element. Appliance 402 also includes a heating element 408, which can be, for instance, a surface heating element, or a bake heating element. Appliance 404 can be, for instance, a speedcooking oven or a convection oven. Cooking platform 400 can also have a third appliance, such as, for instance, a warming drawer, which can be located below appliance 404. A warming drawer is used to heat various items, such as food and plates.

Figure 7:
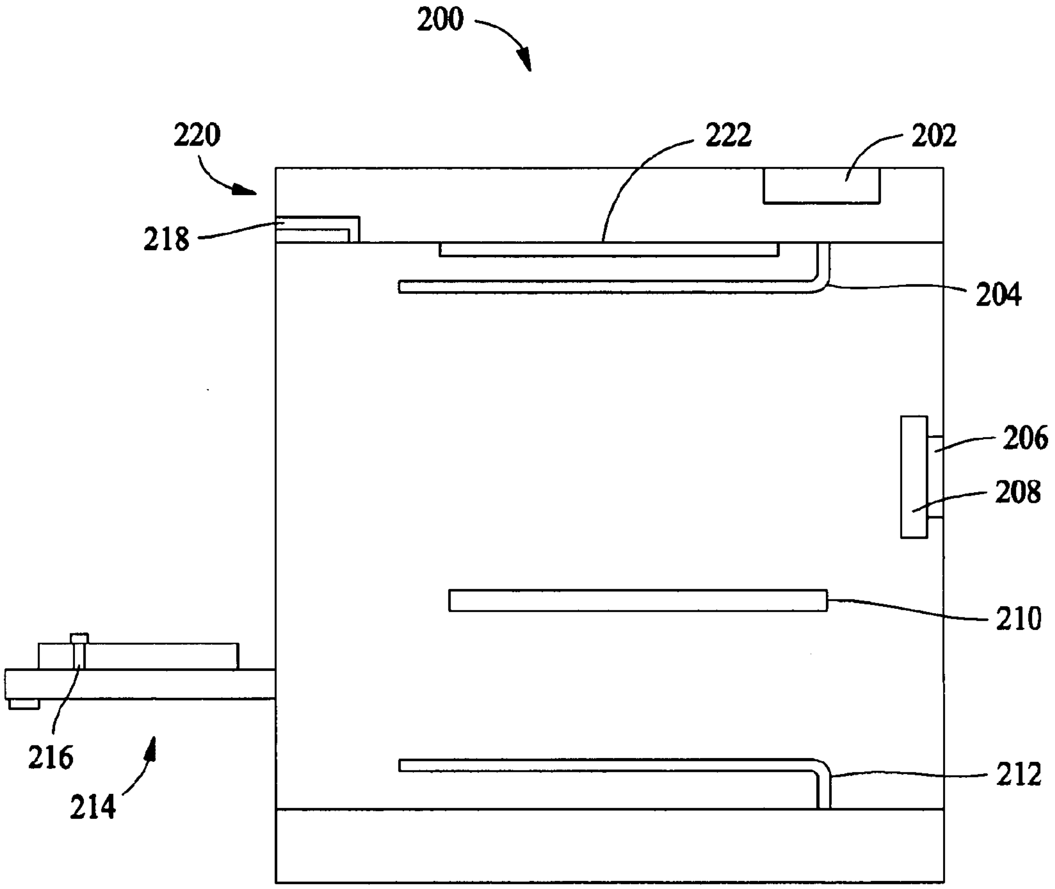
FIG. 7 is a side view of an embodiment of a speedcooking oven.
Figure 8:
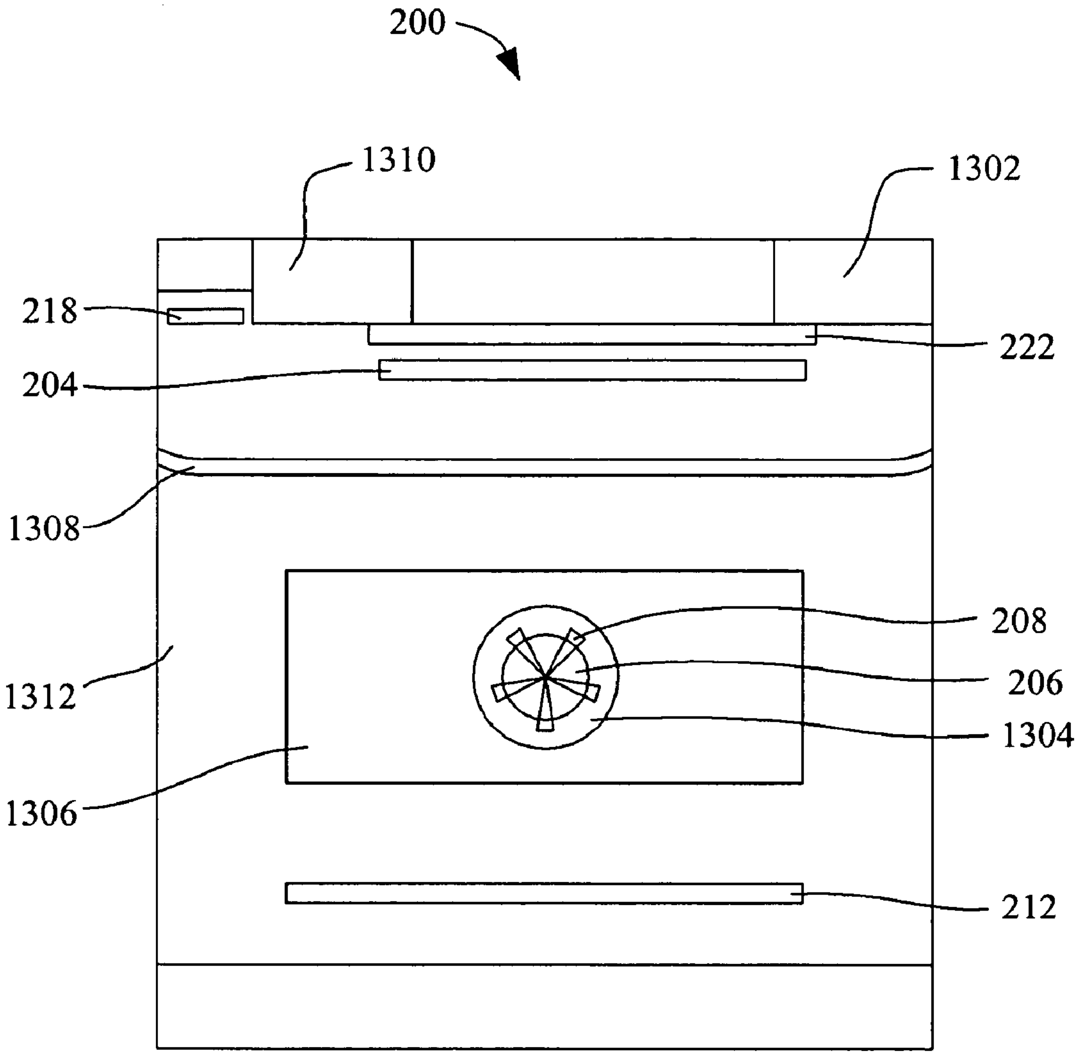
FIG. 8 is a front view of the speedcooking oven shown in FIG. 7.

FIG. 7 is a side view of an embodiment of a speedcooking oven 200 in which circuit 500 is implemented. The power management system and method can also be implemented in other ovens, such as, for instance, a convection oven. FIG. 8 is a front view of speedcooking oven 200. Speedcooking oven 200 has a broil heating element 204, a bake heating element 212, a convection heating element 206, a convection fan 208, a magnetron 202, and a rack 210. Broil heating element 204 is located at a top end inside speedcooking oven 200 and bake heating element 212 is located at a bottom end inside speedcooking oven 200. Convection heating element 206 and convection fan 208 are located at a back end inside speedcooking oven 200. A cover 1304 is provided to shield a user from convection heating element 206 and convection fan 208. Magnetron 202 is located above broil heating element 204 and inside speedcooking oven 200.

Magnetron 202 generates microwave energy to speed cook various food items, which are supported by rack 210. The microwaves are evenly distributed inside speedcooking oven 200 by a microwave disbursement plate 222 that lies between magnetron 202 and broil heating element 204. However, microwaves cannot brown the food items. Heating elements 204, 206, and 212 provide thermal energy that circulates inside speedcooking oven 200 to brown the food. The thermal energy circulates quickly when fan 208 is energized. Air inside speedcooking oven 200 is removed from speedcooking oven 200 via a vent 218.

A door 1312 of speedcooking oven 200 allows access to speedcooking oven 200. Door 1312 has an interlock 216 that prevents the user from opening door 1312 when speedcooking oven 200 is energized. For instance, speedcooking oven 200 is deenergized when the user opens door 1312 during a speedcooking operation. A handle 1308 is used to open door 1312. A window 1306 located on door 1312 allows the user to see the food that is placed inside speedcooking oven 200.

An alphanumeric menu display 1310 of speedcooking oven 200 allows the user to choose between various functions that speedcooking oven 200 performs. For example, the user can use alphanumeric display 1310 to speedcook vegetable lasagna. A status display 1302 notifies the user of various conditions inside speedcooking oven 200. As an instance, status display 1302 can notify the user that the temperature inside speedcooking oven 200 is 327 degrees Fahrenheit. Additionally, when circuit 500 detects a mis-wire condition or a neutral fault condition, display 1302 indicates the detected condition.

FIG. 9 is an alternative embodiment of circuit 500 including a third signal conditioning module 515 and a second load resistor 532. Second resistor 532 has a resistance different than first resistor 530 to provide a predetermined ratio of voltages. Signal conditioning module 515 receives a voltage across resistor 532 and outputs a DC signal proportional to the received voltage. The DC signal is supplied to A/D converter 512 which provides a digitized signal to controller 518. With knowledge of expected impedance based on selected resistance values for resistors 530 and 532, controller 518 is programmed to determine if a mis-wire or neutral fault condition exists.

Exemplary embodiments of combinations of apparatuses and methods are described above in detail. The combinations are not limited to the specific embodiments described herein, but rather, components of each apparatus and method may be utilized independently and separately from other components described herein.

While the invention has been described in terms of various specific embodiments, those skilled in the art will recognize that the invention can be practiced with modification within the spirit and scope of the claims.

What is claimed is:

1. A method for detecting at least one of a mis-wire and a neutral fault in an oven, said method comprising:
- connecting a load resistor between a first power line and a neutral line;
- comparing an alternating current (AC) voltage between the first power line and the neutral line to a first reference voltage range, wherein at least one load is connected via a relay between the first power line and the neutral line; and
- comparing an AC voltage between the first power line and a second power line to a second voltage range.

2. A method in accordance with claim 1 wherein said comparing a voltage between a first power line and a neutral line to a first reference voltage range comprises:
- connecting the first power line and the neutral line to a signal conditioning module that outputs a direct current voltage proportional to the AC voltage between the first power line and the neutral line; and
- connecting an analog to digital (A/D) converter to the signal conditioning module, wherein the A/D converter outputs a digital representation of the direct current voltage.

3. A method in accordance with claim 2 further comprising:
- connecting a controller to the A/D converter;
- receiving at the controller from the A/D converter the digital representation of the voltage between the first power line and an N line; and
- comparing the received digital representation with a range stored in a memory of the controller.

4. A method in accordance with claim 3 further comprising connecting a resistor between the second power line and the neutral line.

5. A method in accordance with claim 3 further comprising providing an indication when the received digital representation in not within the range.

6. A method in accordance with claim 5 wherein said providing an indication comprises providing a visual indication.

7. A method in accordance with claim 3 further comprising controlling the relay based upon whether the received digital representation in within the range.

8. A method in accordance with claim 1 further comprising sizing the load resistor to draw a current greater than a leakage path current when the neutral line is disconnected.

* * * * *